(12) United States Patent
    Kwok et al.

(10) Patent No.: US 12,684,500 B2
(45) Date of Patent: Jul. 14, 2026

(54) DYNAMIC SCHEDULING REQUEST FRAMEWORK FOR HP UE SAR REDUCTION

(71) Applicant: T-Mobile USA, Inc., Bellevue, WA (US)

(72) Inventors: Ming Shan Kwok, Seattle, WA (US); Wafik Abdel Shahid, Kenmore, WA (US); Maksym Siryy, Overland Park, KS (US); William Shvodian, McLean, VA (US); Adeel Ahmed, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 386 days.

(21) Appl. No.: 18/415,619

(22) Filed: Jan. 17, 2024

(65) Prior Publication Data

US 2025/0234307 A1     Jul. 17, 2025

(51) Int. Cl.
    *H04W 52/22*        (2009.01)
    *H04B 1/3827*       (2015.01)
             (Continued)

(52) U.S. Cl.
    CPC ......... *H04W 52/367* (2013.01); *H04L 5/1469* (2013.01); *H04W 28/0278* (2013.01); *H04W 52/225* (2013.01)

(58) Field of Classification Search
    CPC ........... H04W 52/367; H04W 28/0278; H04W 52/225; H04W 72/21; H04W 52/228; H04L 5/1469; H04B 1/3838
    See application file for complete search history.

(56) References Cited

U.S. PATENT DOCUMENTS

| 10,759,756 B2 | 9/2020 | Bursavich et al. | |
| 2012/0021800 A1* | 1/2012 | Wilson | H04W 72/02 |
| | | | 455/127.1 |

(Continued)

FOREIGN PATENT DOCUMENTS

| EP | 0085630 A1 | 8/1983 |
| EP | 3433253 B1 | 2/2020 |

(Continued)

OTHER PUBLICATIONS

International Search Report and Written Opinion received in International Application No. PCT/US2024/046551, mailed on Jan. 7, 2025, 8 pages.

(Continued)

*Primary Examiner* — Joseph E Dean, Jr.
(74) *Attorney, Agent, or Firm* — Foley IP Law, PLLC

(57)            ABSTRACT

A dynamic scheduling request framework reduces the need of a user equipment (UE) to reduce peak transmit power when approaching the specific absorption rate (SAR) limit. This preserves the ability of UEs to overcome interference (e.g., when near a cell edge), reducing dropped calls, and retains the advantages of high power UEs (HP UEs), such as power class 2 (PC2) devices. When the combination of the current buffer status report (BSR), indicating more data to transmit, with the current peak transmit power and historical average transmitted power indicates a risk that the UE will violate the SAR limit, logic in the UE and/or the network reduces the number of resource blocks (RBs) allocated to the UE. By dropping the duty cycle of the transmitter, even while retaining the current peak transmit power, the average transmitted power will drop. Upon the SAR violation risk abating, the RB allocation returns to normal.

20 Claims, 14 Drawing Sheets

(51) Int. Cl.
  *H04L 5/14* (2006.01)
  *H04W 28/02* (2009.01)
  *H04W 52/36* (2009.01)

(56) References Cited

U.S. PATENT DOCUMENTS

| | | | |
|---|---|---|---|
| 2016/0242128 A1* | 8/2016 | Loehr .................... | H04W 52/34 |
| 2017/0332333 A1 | 11/2017 | Santhanam et al. | |
| 2020/0213952 A1 | 7/2020 | Wang et al. | |
| 2023/0016288 A1 | 1/2023 | Chauvin et al. | |
| 2023/0156625 A1 | 5/2023 | Liu et al. | |
| 2024/0196344 A1 | 6/2024 | Aagiru et al. | |
| 2025/0227624 A1 | 7/2025 | Kwok et al. | |

FOREIGN PATENT DOCUMENTS

| | | | |
|---|---|---|---|
| EP | 3799487 A1 | 3/2021 | |
| WO | 1998017881 A1 | 4/1998 | |
| WO | 2017135471 A1 | 8/2017 | |
| WO | 2023125182 A1 | 7/2023 | |

OTHER PUBLICATIONS

International Search Report and Written Opinion received in International Application No. PCT/US2024/046548, mailed on Jan. 9, 2025, 9 pages.

Non-Final Office Action mailed Jan. 12, 2026, in U.S. Appl. No. 18/408,518, 12 pages.

International Search Report and Written Opinion mailed Mar. 7, 2025, in International Application No. PCT/US2024/059420, 11 pages.

International Search Report and Written Opinion received in International Application No. PCT/US2024/059417, mailed on Mar. 10, 2025, 10 pages.

* cited by examiner

FIG 6

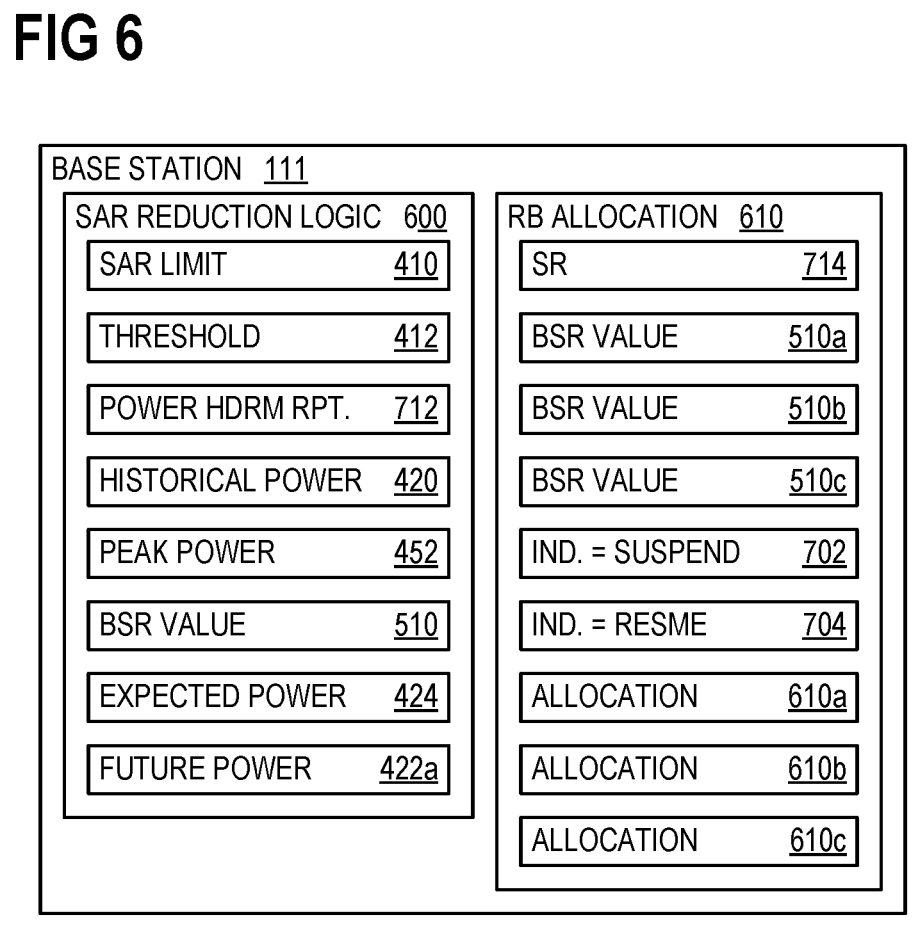

BASE STATION 111

SAR REDUCTION LOGIC 600

| SAR LIMIT | 410 |
| THRESHOLD | 412 |
| POWER HDRM RPT. | 712 |
| HISTORICAL POWER | 420 |
| PEAK POWER | 452 |
| BSR VALUE | 510 |
| EXPECTED POWER | 424 |
| FUTURE POWER | 422a |

RB ALLOCATION 610

| SR | 714 |
| BSR VALUE | 510a |
| BSR VALUE | 510b |
| BSR VALUE | 510c |
| IND. = SUSPEND | 702 |
| IND. = RESME | 704 |
| ALLOCATION | 610a |
| ALLOCATION | 610b |
| ALLOCATION | 610c |

FIG. 7

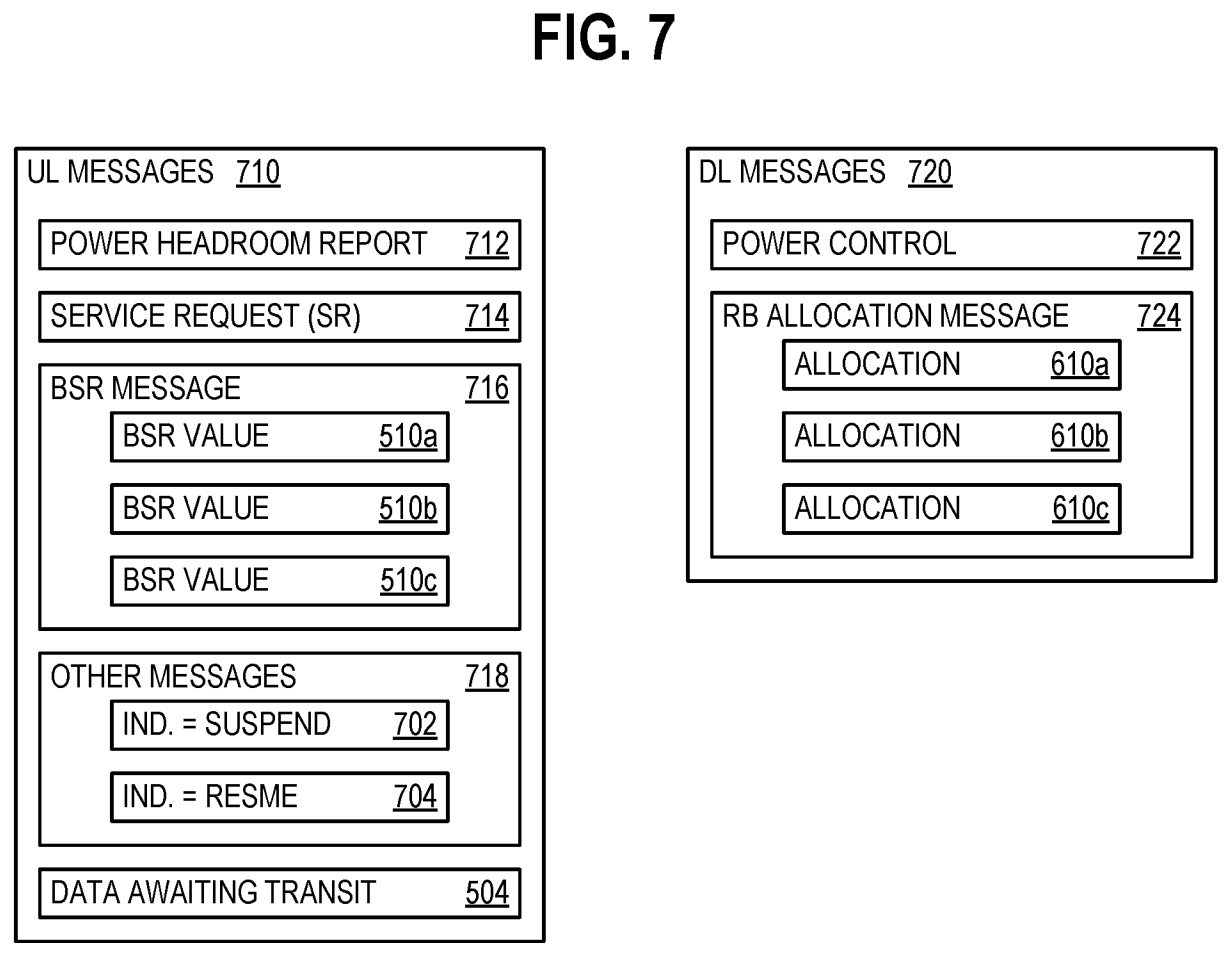

DL MESSAGES  720

POWER CONTROL  722

RB ALLOCATION MESSAGE  724

ALLOCATION  610a

ALLOCATION  610b

ALLOCATION  610c

UL MESSAGES  710

POWER HEADROOM REPORT  712

SERVICE REQUEST (SR)  714

BSR MESSAGE  716

BSR VALUE  510a

BSR VALUE  510b

BSR VALUE  510c

OTHER MESSAGES  718

IND. = SUSPEND  702

IND. = RESME  704

DATA AWAITING TRANSIT  504

Figure 11A:
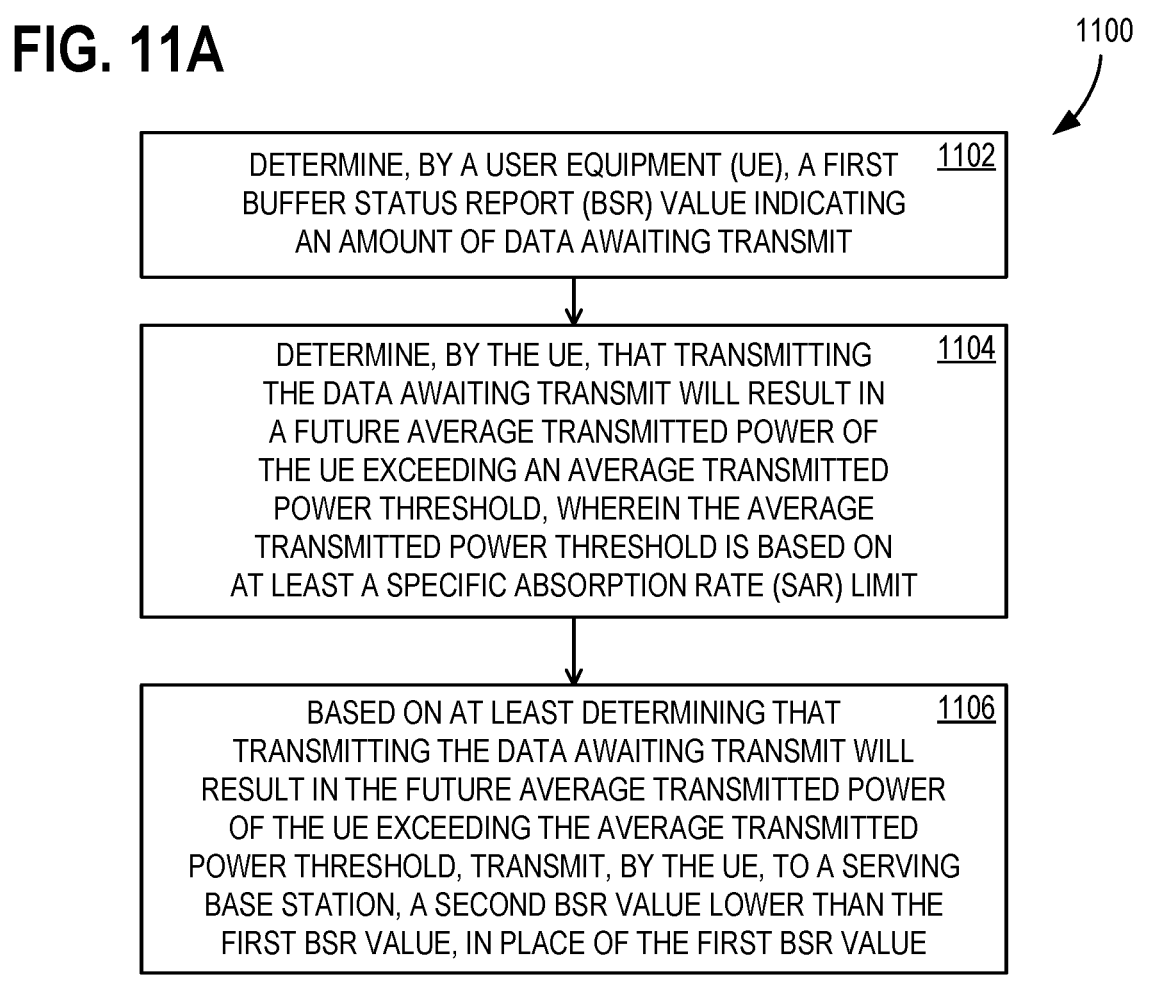

DETERMINE, BY A USER EQUIPMENT (UE), A FIRST    1102
BUFFER STATUS REPORT (BSR) VALUE INDICATING
AN AMOUNT OF DATA AWAITING TRANSMIT

DETERMINE, BY THE UE, THAT TRANSMITTING    1104
THE DATA AWAITING TRANSMIT WILL RESULT IN
A FUTURE AVERAGE TRANSMITTED POWER OF
THE UE EXCEEDING AN AVERAGE TRANSMITTED
POWER THRESHOLD, WHEREIN THE AVERAGE
TRANSMITTED POWER THRESHOLD IS BASED ON
AT LEAST A SPECIFIC ABSORPTION RATE (SAR) LIMIT

BASED ON AT LEAST DETERMINING THAT    1106
TRANSMITTING THE DATA AWAITING TRANSMIT WILL
RESULT IN THE FUTURE AVERAGE TRANSMITTED POWER
OF THE UE EXCEEDING THE AVERAGE TRANSMITTED
POWER THRESHOLD, TRANSMIT, BY THE UE, TO A SERVING
BASE STATION, A SECOND BSR VALUE LOWER THAN THE
FIRST BSR VALUE, IN PLACE OF THE FIRST BSR VALUE

Figure 11B:
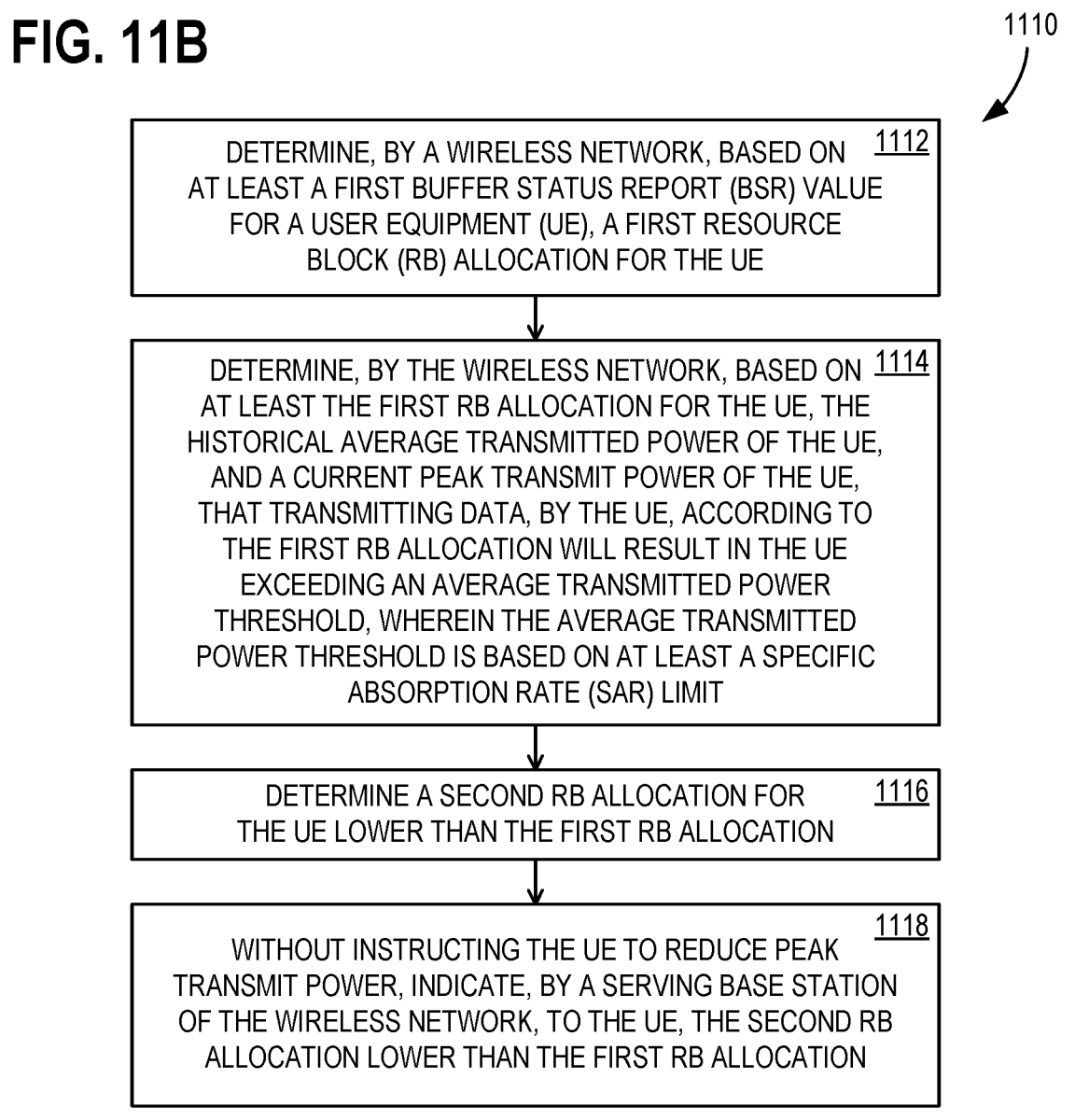

DETERMINE, BY A WIRELESS NETWORK, BASED ON   <u>1112</u>
AT LEAST A FIRST BUFFER STATUS REPORT (BSR) VALUE
FOR A USER EQUIPMENT (UE), A FIRST RESOURCE
BLOCK (RB) ALLOCATION FOR THE UE

DETERMINE, BY THE WIRELESS NETWORK, BASED ON <u>1114</u>
AT LEAST THE FIRST RB ALLOCATION FOR THE UE, THE
HISTORICAL AVERAGE TRANSMITTED POWER OF THE UE,
AND A CURRENT PEAK TRANSMIT POWER OF THE UE,
THAT TRANSMITTING DATA, BY THE UE, ACCORDING TO
THE FIRST RB ALLOCATION WILL RESULT IN THE UE
EXCEEDING AN AVERAGE TRANSMITTED POWER
THRESHOLD, WHEREIN THE AVERAGE TRANSMITTED
POWER THRESHOLD IS BASED ON AT LEAST A SPECIFIC
ABSORPTION RATE (SAR) LIMIT

DETERMINE A SECOND RB ALLOCATION FOR       <u>1116</u>
THE UE LOWER THAN THE FIRST RB ALLOCATION

<u>1118</u>
WITHOUT INSTRUCTING THE UE TO REDUCE PEAK
TRANSMIT POWER, INDICATE, BY A SERVING BASE STATION
OF THE WIRELESS NETWORK, TO THE UE, THE SECOND RB
ALLOCATION LOWER THAN THE FIRST RB ALLOCATION

Figure 11C:
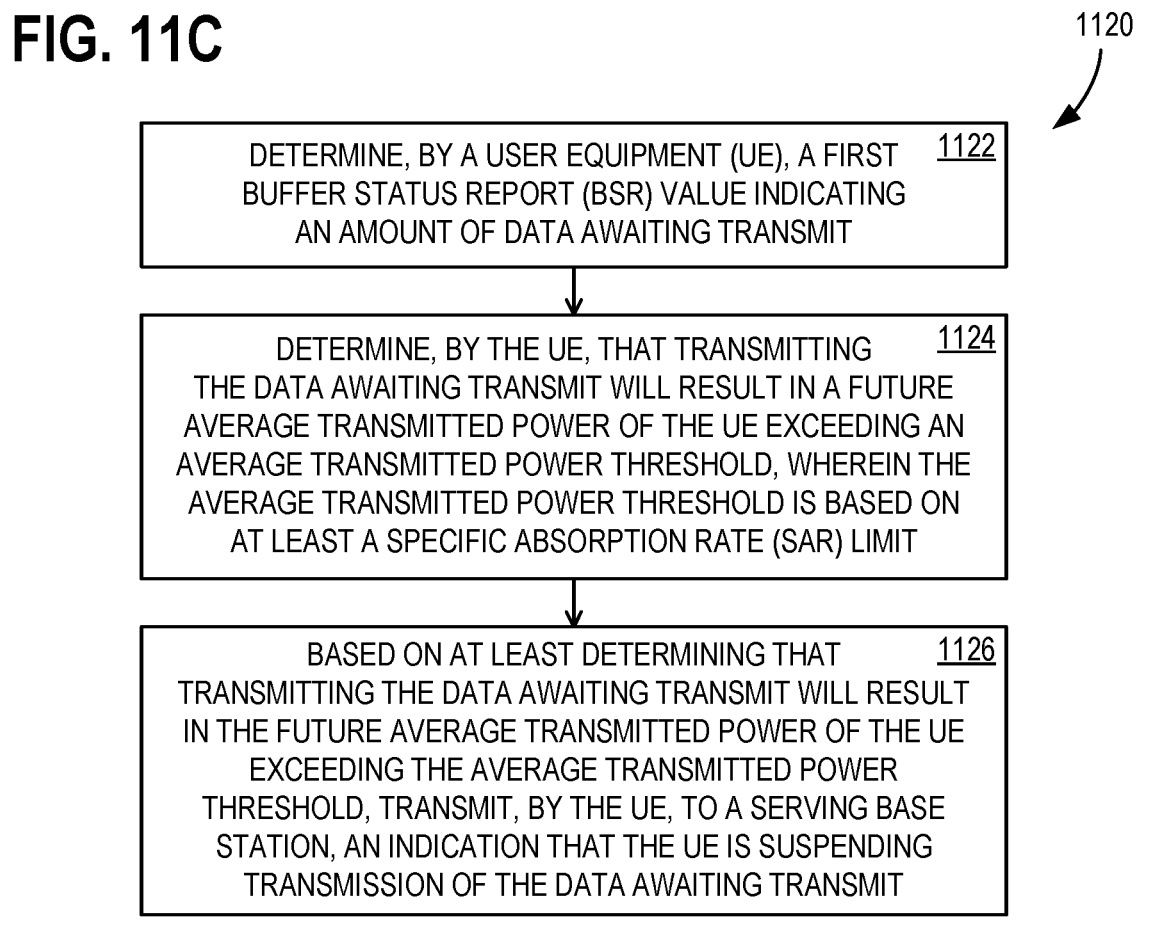

DETERMINE, BY A USER EQUIPMENT (UE), A FIRST　1122
BUFFER STATUS REPORT (BSR) VALUE INDICATING
AN AMOUNT OF DATA AWAITING TRANSMIT

DETERMINE, BY THE UE, THAT TRANSMITTING　1124
THE DATA AWAITING TRANSMIT WILL RESULT IN A FUTURE
AVERAGE TRANSMITTED POWER OF THE UE EXCEEDING AN
AVERAGE TRANSMITTED POWER THRESHOLD, WHEREIN THE
AVERAGE TRANSMITTED POWER THRESHOLD IS BASED ON
AT LEAST A SPECIFIC ABSORPTION RATE (SAR) LIMIT

BASED ON AT LEAST DETERMINING THAT　1126
TRANSMITTING THE DATA AWAITING TRANSMIT WILL RESULT
IN THE FUTURE AVERAGE TRANSMITTED POWER OF THE UE
EXCEEDING THE AVERAGE TRANSMITTED POWER
THRESHOLD, TRANSMIT, BY THE UE, TO A SERVING BASE
STATION, AN INDICATION THAT THE UE IS SUSPENDING
TRANSMISSION OF THE DATA AWAITING TRANSMIT

DYNAMIC SCHEDULING REQUEST FRAMEWORK FOR HP UE SAR REDUCTION

BACKGROUND

User equipment (UE) transmit power, for the uplink (UL) channel to the serving base station, is typically the primary limitation for coverage in a cellular network. Coverage is reduced when the distance of a UE from a serving base station, coupled with interference (from other UEs and other sources), reduces the signal to interference and noise ratio (SINR) as received by the serving base station of the UE. A low SINR increases the bit error rate (BER), preventing the serving base station from properly decoding transmissions from the UE. In such a scenarios, any ongoing call with for UE is at risk of being dropped, negatively impacting network throughput.

High power UEs (HP UEs) are able to transmit at higher power levels such as, for some frequency bands, 26 decibel milliwatts (dBm) or 29 dBm, versus 23 dBm for legacy UEs. HP UEs may be referred to as power class 2 (PC2), PC1, or PC1.5 UEs, whereas legacy UEs may be referred to as PC3 UEs. The higher power permits an HP UE to overcome interference when it is located relatively far from the serving base station, thereby preserving an acceptable SINR and reducing the number of dropped calls.

However, when transmitting at higher power levels (as permitted by the serving base station's power control function), HP UEs have a higher risk of violating the specific absorption rate (SAR) limit imposed on cellular phones. The SAR limit is a limit on the radio frequency (RF) power to which the UE exposes the human user, and is determined using an average transmitted power during a time window. If the UE is transmitting at relatively high power during the first portion of a time window, it risks violating SAR limit if the high power transmissions continue. The traditional response to preventing the UE from violating the SAR limit is to reduce the peak transmit power (e.g., power back-off) until the average transmitted power has dropped sufficiently. Unfortunately, this has the result of negating the advantage of an HP UE to overcome interference, and increases the risk of a dropped call.

SUMMARY

The following summary is provided to illustrate examples disclosed herein, but is not meant to limit all examples to any particular configuration or sequence of operations.

A dynamic scheduling request framework reduces the need of a user equipment (UE) to reduce peak transmit power when approaching the specific absorption rate (SAR) limit. Examples determine, by a UE, a first buffer status report (BSR) value indicating an amount of data awaiting transmit; determine, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmit, by the UE, to a serving base station, a second BSR value lower than the first BSR value, in place of the first BSR value.

Additional examples determine, by a wireless network, based on at least a first BSR value for a UE, a first resource block (RB) allocation for the UE; determine, by the wireless network, based on at least the first RB allocation for the UE, the historical average transmitted power of the UE, and a current peak transmit power of the UE, that transmitting data, by the UE, according to the first RB allocation will result in the UE exceeding an average transmitted power threshold, wherein the average transmitted power threshold is based on at least a SAR limit; determine a second RB allocation for the UE lower than the first RB allocation; and without instructing the UE to reduce peak transmit power, indicate, by a serving base station of the wireless network, to the UE, the second RB allocation lower than the first RB allocation.

Further examples determine, by a UE, a first BSR value indicating an amount of data awaiting transmit; determining, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmitting, by the UE, to a serving base station, an indication that the UE is suspending transmission of the data awaiting transmit.

BRIEF DESCRIPTION OF THE DRAWINGS

The disclosed examples are described below with reference to the accompanying drawing figures listed below, wherein:

FIG. 6 illustrates further detail for the base station of FIG. 1, employing a dynamic scheduling request framework;

FIG. 7 illustrates various exemplary messages that may be used in the dynamic scheduling request framework of FIG. 1;

FIGS. 11A, 11B, and 11C illustrate additional flowcharts of exemplary operations associated with the architecture of FIG. 1.

Figure 1:
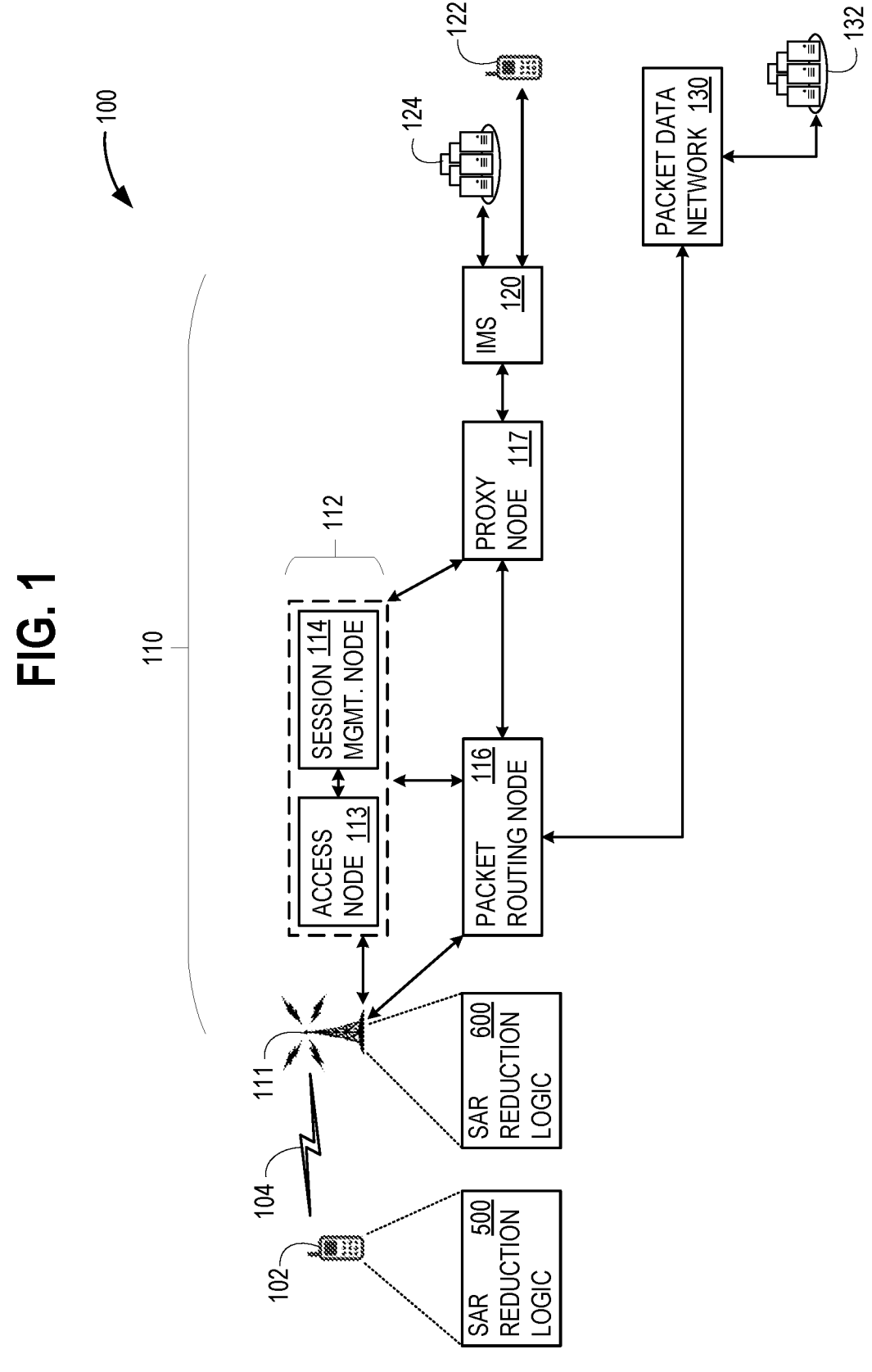
FIG. 1 illustrates an exemplary architecture that advantageously provide a dynamic scheduling request framework for high power user equipment (HP UE) specific absorption rate (SAR) reduction, to enhance network coverage and throughput.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A dynamic scheduling request framework reduces the need of a user equipment (UE) to reduce peak transmit power when approaching the specific absorption rate (SAR) limit. This preserves the ability of UEs to overcome interference (e.g., when near a cell edge), reducing dropped calls, and retains the advantages of high power UEs (HP UEs), such as power class 2 (PC2) devices and higher power UEs (e.g. PC1 and PC1.5). When the combination of the current buffer status report (BSR), indicating more data to transmit, with the current peak transmit power and historical average transmitted power indicates a risk that the UE will violate the SAR limit, logic in the UE and/or the network reduces the number of resource blocks (RBs) allocated to the UE. By dropping the duty cycle of the transmitter, even while retaining the current peak transmit power, the average transmitted power will drop. Upon the SAR violation risk abating, the RB allocation returns to normal.

Aspects of the disclosure improve the reliability and throughput of cellular networks, by permitting UEs that are approaching their SAR limit to retain high peak transmit power to overcome interference. The result is that, with an improved signal-to-interference-and-noise ratio (SINR), over what is available with traditional methods, a higher network throughput and fewer dropped calls means that fewer base stations are needed to serve a given number of users—or a larger number of users may be supported with the same level of resources. These advantageous results are accomplished, at least in part by (in some examples) transmitting, by the UE, to a serving base station, a lower BSR value (e.g., zero, a flag, or another value) in place of a BSR value that indicates an amount of data awaiting transmit; or (in some examples) indicating, by a serving base station of the wireless network, to the UE, an RB allocation lower than the RB allocation that is based on the UE's BSR value.

With reference now to the figures, FIG. 1 illustrates an exemplary architecture 100 that advantageously provides a dynamic scheduling request framework for UE SAR reduction (e.g., HP UEs and even legacy power UEs). In the scene depicted in FIG. 1, a UE 102 is using wireless network 110 to upload data (shown in FIG. 7) to a network resource 132, such as a website, and thus has a need for a relatively high uplink throughput. UE 102 may be a cellular telephone, such as a smartphone, but may also represent other telecommunication devices capable of using a wireless network, such as a personal computer (PC, e.g., desktop, notebook, tablet, etc.) with a cellular modem. UE 102 uses time division duplexing (TDD), and in some examples comprises an HP UE, such as a PC2, PC1.5, or PC1 device.

Wireless network 110 may be a cellular network such as a fifth-generation cellular technology (5G) network, a fourth-generation cellular technology (4G) network, or another cellular generation network. In normal cellular operation, UE 102 uses an air interface 104 to communicate with a serving base station 111 of wireless network 110. In some scenarios, base station 111 may also be referred to as a radio access network (RAN). Wireless network 110 has a control plane 112 comprising an access node 113 and a session management node 114. Wireless network 110 also has a packet routing node 116, a proxy node 117, and an internet protocol (IP) multimedia subsystem (IMS) 120.

Base station 111 is in communication with access node 113 and packet routing node 116. Access node 113 is in communication with session management node 114. Packet routing node 116 is in communication with session management node 114, proxy node 117, and an external packet data network 130, such as the internet. Proxy node 117 is in communication with IMS 120, which provides connectivity to other wireless (cellular) networks or a public switched telephone system (POTS). In some examples, proxy node 117 may be considered to be within IMS 120.

UE 102 reaches other telephones, such as another UE 122 via IMS 120, and also some media resources, such as a network resource 124. UE 102 reaches network resource 132 via packet data network 130. Data packets from UE 102 pass through at least base station 111 and packet routing node 116 on their way to external packet data network 130 or IMS 120 (via proxy node 117).

In some 5G examples, base station 111 comprises a gNodeB (gNB), access node 113 comprises an access mobility function (AMF), session management node 114 comprises a session management function (SMF), and packet routing node 116 comprises a user plane function (UPF). In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G. In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

UE 102 has SAR reduction logic 500 in versions of architecture 100 in which UE 102 implements at least some of a dynamic scheduling request framework. UE 102 and SAR reduction logic 500 are illustrated in further detail in FIG. 5. Base station 111 has SAR reduction logic 600 in versions of architecture 100 in which base station 111 implements at least some of a dynamic scheduling request framework. Base station 111 and SAR reduction logic 600 are illustrated in further detail in FIG. 6. In various versions of architecture 100, UE 102 has all of the new logic and no changes are required for base station 111, or base station 111 has all of the new logic and no changes are required for UE 102, or both UE 102 and base station 111 have new logic. These three different scenarios are described in further detail in relation to flowcharts 800, 900, and 1000, if FIGS. 8, 9, and 10, respectively.

Figure 2:
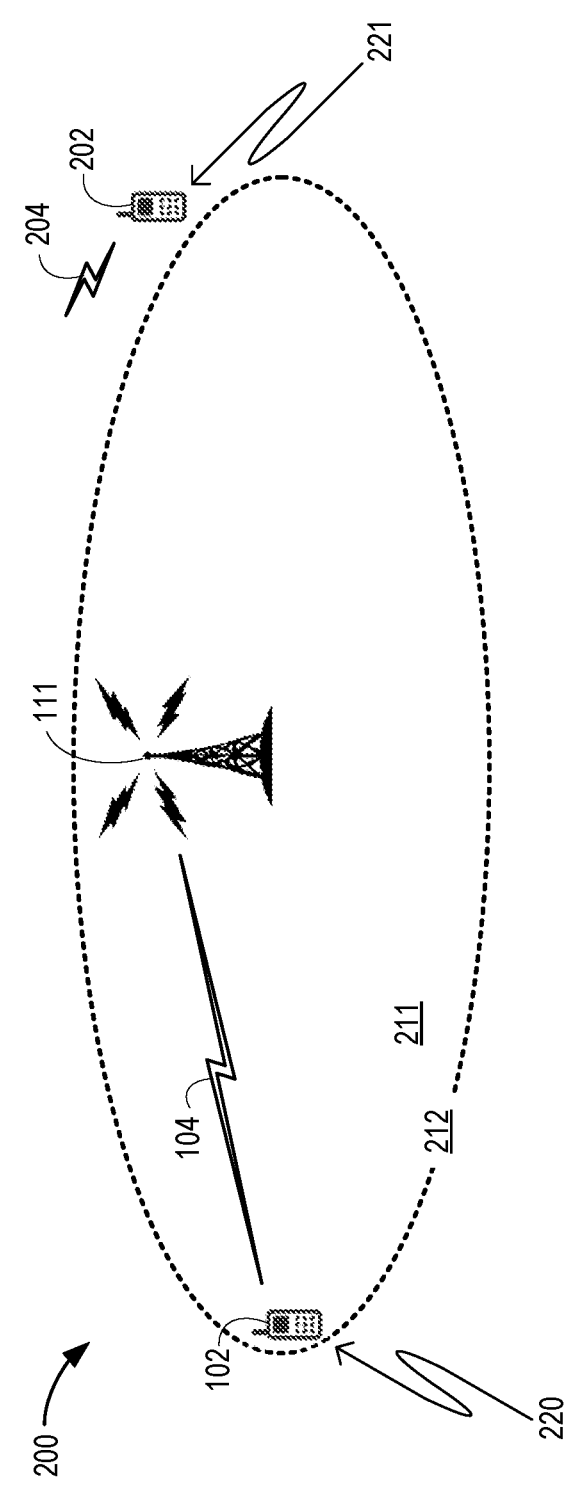
FIG. 2 illustrates an interference scenario, as may occur in wireless networks, such as the wireless network of the architecture of FIG. 1.

Turning to FIG. 2, an interference scenario 200, that triggers a need for the advantageous operations of architecture 100, is described. Base station 111 provides a cell 211, with a notional cell edge 212 (shown as a dotted line). UE 102 is at a location 220, in cell 211, being served by base station 111, although near cell edge 212. Due to the distance between UE 102 and base station 111, the attenuation over air interface 104 is significant.

Another UE 202, at a location 221, is being served by another base station over an air interface 204. However, transmissions from UE 202 also reach base station 111 interfering with UE 102 and air interface 104. This interference imposes an additional burden over the attenuation of air interface 104. If the SINR, experienced by base station 111 for transmissions from UE 102, is not sufficiently high, the bit error rate (BER) will become so high that base station 111 will be unable to properly decode transmissions from UE 102. Thus, in this interference scenario 200, it is undesirable for UE 102 to reduce its peak transmit power.

Figure 3:
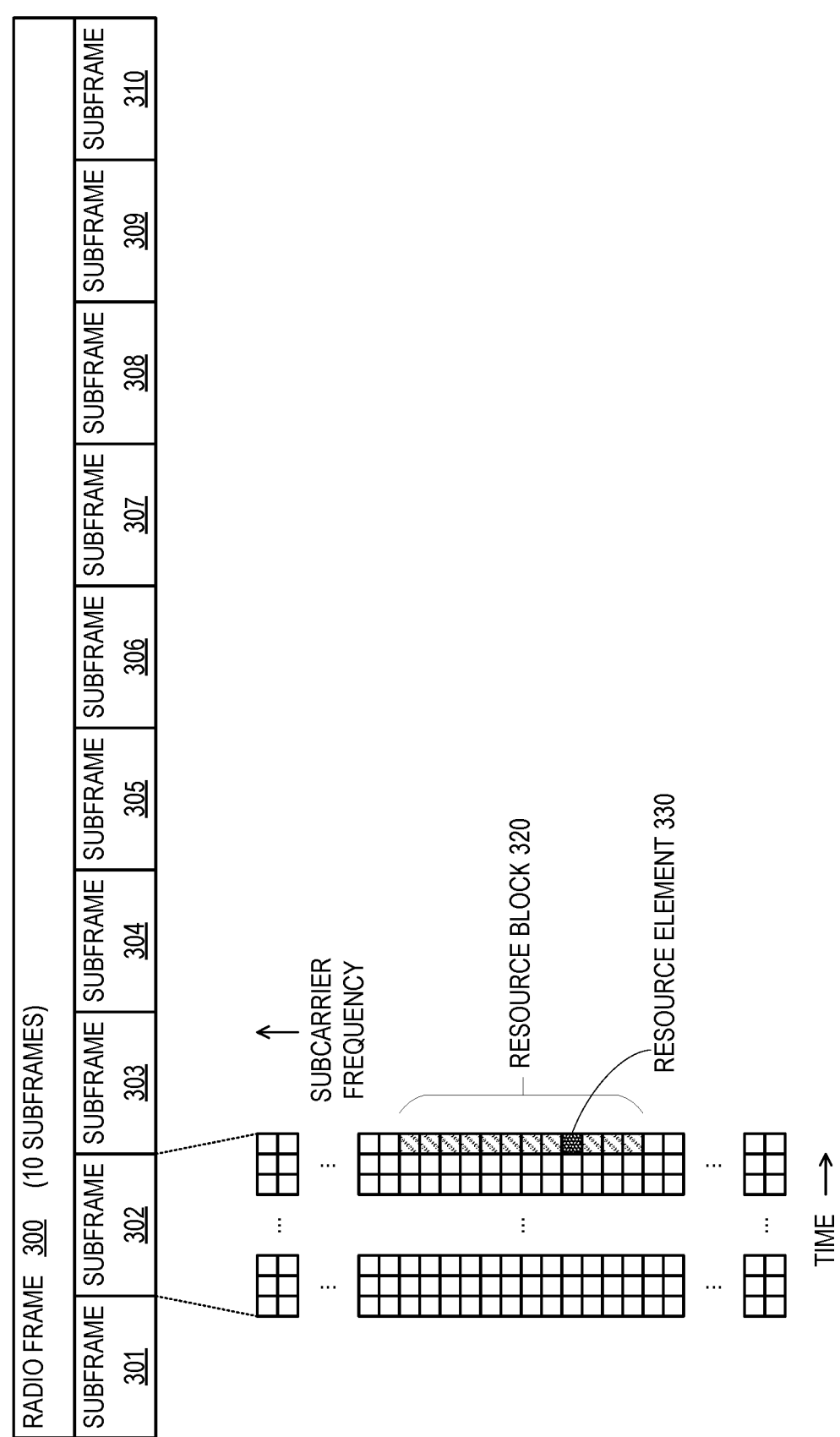
FIG. 3 illustrates an exemplary radio frame with an exemplary resource block (RB), as may be used in the architecture of FIG. 1.

FIG. 3 illustrates an exemplary radio frame 300, as may be used on a data channel in some TDD arrangements, such as architecture 100. In some examples, a radio frame has 10 subframes, and lasts for 10 milliseconds (ms). As illustrated, radio frame 300 has a subframe 301, a subframe 302, a subframe 303, a subframe 304, a subframe 305, a subframe 306, a subframe 307, a subframe 308, a subframe 309, and a subframe 310. In some examples, a subframe has 64 slots, and lasts 1 ms, meaning that a radio frame has 640 slots (time slots). In some examples, a slot lasts 0.01565 ms and can accommodate 14 symbols.

Subframe 302 is expanded to show a matrix of resource elements 330. A resource element is one subcarrier during one slot. An RB within a subframe is a set of resource elements, for example 12 subcarriers during a single slot. As illustrated, an RB 320 is within subframe 302. In operation, serving base station 111 allocates resource elements and RBs among the UEs it is serving, from available subframes. The allocations are based on at least the BSRs from each UE, which indicate how much data each UE has to transmit. A prioritization scheme (not described here) is used to prioritize RBs among the UEs when the number of UEs served, and the data each needs to transmit, exceeds the available capacity of a radio frame. In general though, the higher the BSR for a UE, the more RBs will be allocated to it, whereas a UE with no data to transmit (e.g., the BSR indicates zero) will not be allocated an RB in the data channel.

Figure 4:
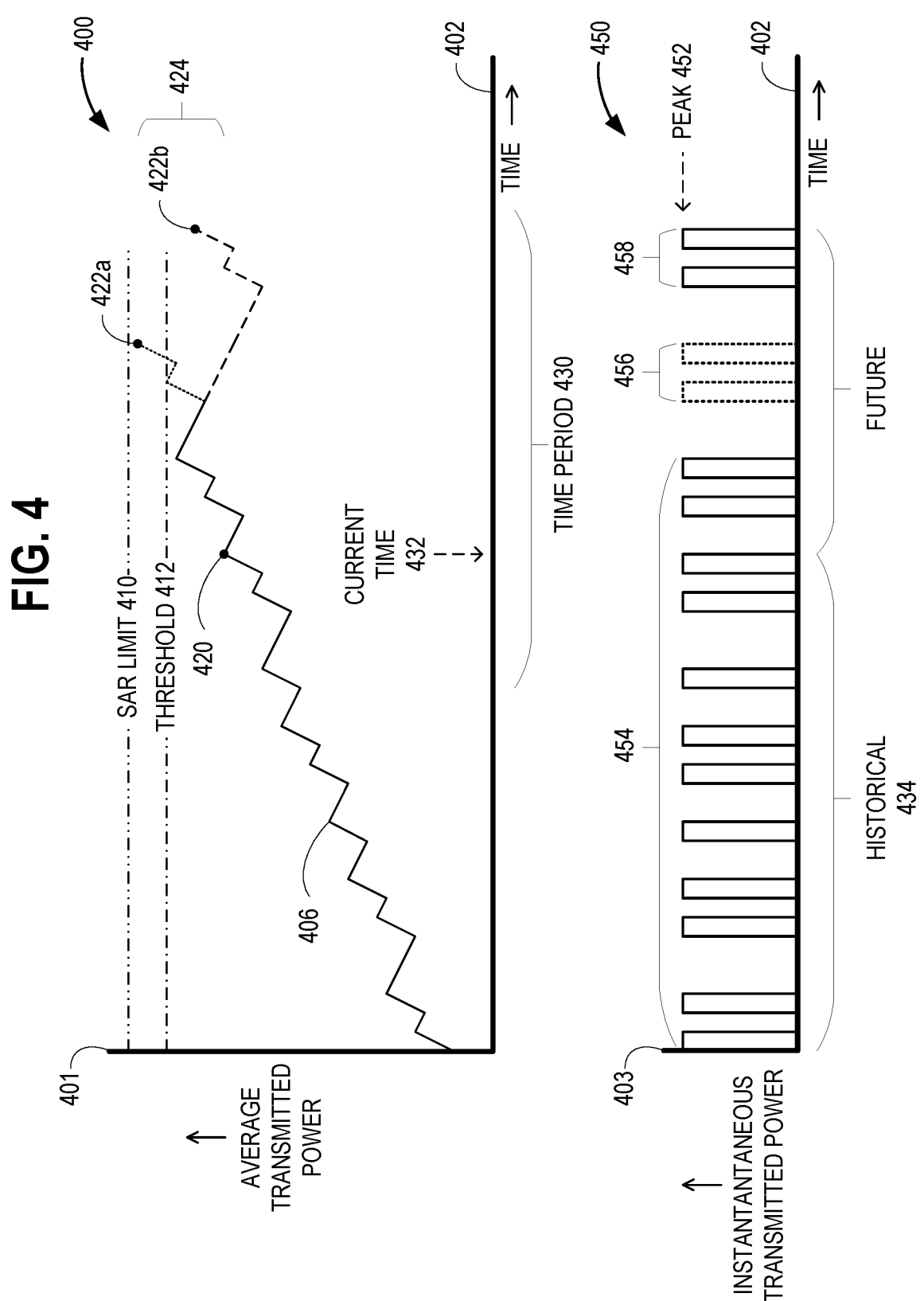
FIG. 4 illustrates exemplary factors relating transmit power and a SAR limit, as may occur in examples of the architecture of FIG. 1.

FIG. 4 illustrates exemplary factors relating transmit power and a SAR limit 410 using a plot 400 of average transmitted power 401 (vertical axis) versus time 402 (horizontal axis) and a parallel, time-coincident plot 450 of instantaneous transmitted power 403 (vertical axis) versus time 402. Plots 400 and 450 include a time period 430 during which average transmitted power 401 is assessed for potential violation of SAR limit 410. An average transmitted power threshold 412 is used as a proxy for SAR limit 410, and in some examples may be set slightly lower than SAR limit 410 to provide a safety margin. In some examples, though, transmitted power threshold 412 may be set at SAR limit 410.

In some examples, time period 430 is six minutes, since SAR standards in some regions use a six minute averaging window. However FIG. 4 should not be interpreted as drawn to scale. Time period 430 includes a current time 432, and spans from a historical time period 434 into a future time period 436. Time period 430 moves as current time 432 progresses forward, and in some examples is a moving time window that tracks current time 432.

Plot 400 shows an average transmitted power curve 406 that reaches historical average transmitted power 420 at current time 432. Plot 450 shows a series of transmission times (in accordance with TDD operation), in which UE 102 transmits at a current peak transmit power 452 for short durations during its allocated transmission times (as allocated by wireless network 110). A set of transmission events 454 are shown occurring all at current peak transmit power 452, although in general, the transmission power may vary among transmission events. At time progresses, each transmission event increases average transmitted power curve 406 while the transmission event is ongoing, and then average transmitted power curve 406 drops as time progresses after the transmission event concludes, as a result of the time base for the averaging window moving along with increasing time.

When transmission events occur closer in time, average transmitted power curve 406 trends higher at a faster rate (although there are drops between transmission events), and when transmission events occur further apart in time, average transmitted power curve 406 trends higher at a slower rate, or may trend downward. This illustrates how the duty factor of a transmitter affects average transmitted power. A duty factor is the percentage of time that some equipment is producing output. For example, if two transmitters each transmit at the same peak power, but one transmits more often than the other, the one that transmits more often has a higher duty factor and also produces a higher average transmitted power.

As described more fully in relation to FIG. 5 below, a future average transmitted power 422a is determined (e.g., predicted by calculation) by adding an expected transmission power 424 to historical average transmitted power 420. Expected transmission power 424 is determined by using expected transmission events 456 and an expected peak transmit power (which may remain at current peak transmit power 452, for simplicity of the description). Expected transmission events 456 are forecast (predicted) using the BSR of UE 102. The higher the BSR value, the more transmission events are needed to finish transmitting data that UE 102 has within its buffer 502 (described in more detail in relation to FIG. 5).

As shown in FIG. 4, by transmitting expected transmission events 456 at current peak transmit power 452, a future average transmitted power 422a is predicted to exceed average transmitted power threshold 412. This is shown as the dotted portion of average transmitted power curve 406.

However, by delaying data transmission, and not transmitting expected transmission events 456 (or transmitting fewer), expected transmission power 424 drops, and average transmitted power curve 406 trends downward (as time progresses past the final transmission event). Upon resuming transmission at a later time, with expected transmission events 458, a future average transmitted power 422b is predicted to not exceed average transmitted power threshold 412. This is shown as the dashed portion of average transmitted power curve 406. In some examples, the delay to resume transmitting is approximately one radio frame.

Figure 5:
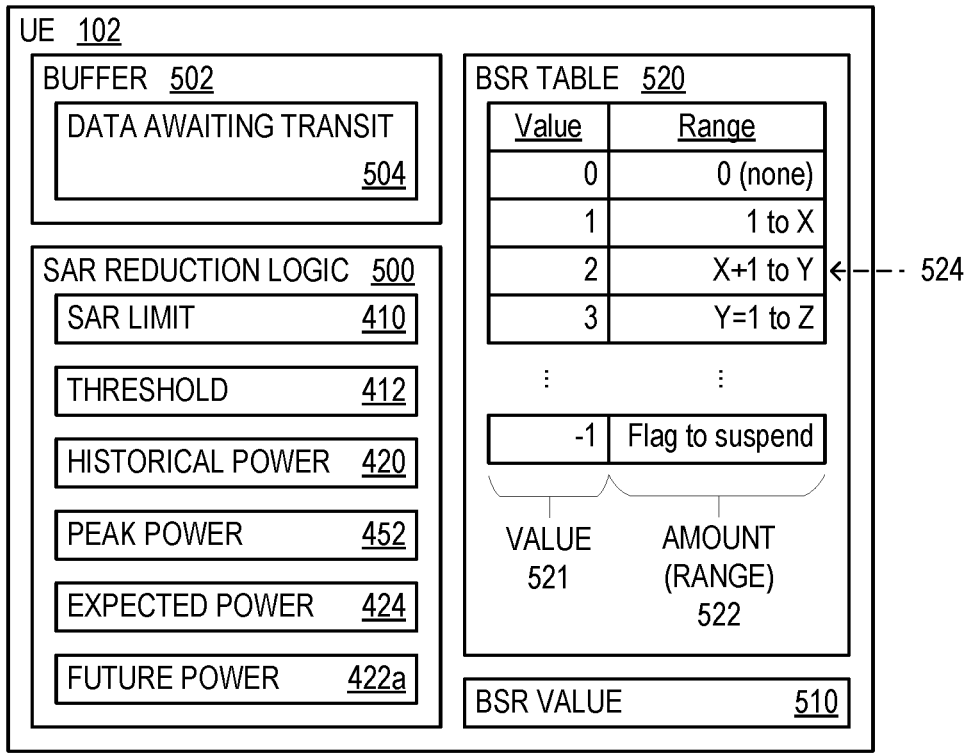
FIG. 5 illustrates further detail for the UE of FIG. 1, employing a dynamic scheduling request framework.

FIG. 5 illustrates further detail for UE 102. UE 102 has a transmit data buffer 502 that hold data awaiting transmit 504. Data awaiting transmit 504 may include voice data for a voice call with UE 122 and/or other data being uploaded to network resources 132 and/or 124. In some examples, UE 102 reports the status of buffer 502 to wireless network 110 using a bitfield that is only 6 bits wide. This precludes transmitting a numerical count of the amount of date (in bits or bytes) of data awaiting transmit 504. A BSR value table 520 maps a particular value in a value column 521 to an amount of data, expressed in a range of values, in an amount column 522.

BSR value table 520 has a zero (0) value for an empty buffer 502 (no data waiting transmission), and index values for various ranges. In some examples, a flag (e.g., "−1") is used as an indication that UE 102 needs to suspend transmission (delay transmitting further data). As indicated, a BSR value 510 is selected for an amount 524 of data awaiting transmit 504. For example, an index value of 2 is selected as BSR value 510, reflecting that the number of bits or bytes of data awaiting transmit 504 is within the range specified by amount 524.

In some examples, UE 102 has all of the new logic for the dynamic scheduling request framework. In such examples, no changes are needed to wireless network 110. In some examples, both UE 102 and wireless network have new logic for the dynamic scheduling request framework. In both of these classes of examples, UE 102 has SAR reduction logic 500.

SAR reduction logic 500 knows SAR limit 410 and average transmitted power threshold 412 (if different than SAR limit 410). UE 102 tracks its historical average transmitted power 420, and knows its current peak transmit power 452. SAR reduction logic 500 calculates expected transmission power 424 using BSR value 510 and the power at which it predicts it will continue transmitting, such as current peak transmit power 452. That is, UE 102 knows how much data it has to transmit, and so can predict the power needed to transmit it, using an expected RB allocation from wireless network 110. Combining expected transmission power 424 with historical average transmitted power 420, and accounting for the forward time progression of time period 430, gives future average transmitted power 422a.

As indicated in the description of FIG. 4, if future average transmitted power 422a exceeds average transmitted power threshold 412, UE 102 needs to suspend or otherwise reduce transmitting. One option is for SAR reduction logic 500 to change BSR value 510 by setting it to 0, incorrectly indicating that UE 102 has no data in buffer 502 awaiting transmit. Wireless network 110, believing (incorrectly) that UE 102 has no data in buffer 502, will not assign any RBs to UE 102. UE 102 then suspends transmission of data without needing to do anything else, because UE 102 already has logic to only transmit data in allocated RBs. This option permits wireless network 110 to continue operating with legacy logic, while supporting this SAR reduction scheme. Another option is for UE 102 to transmit a lower BSR value, expecting to receive allocation of fewer RBs.

Yet another option is for UE 102 to transmit a flag to base station 111, either as BSR value 510, or as a separate message. This is described in further detail below, in relation to FIG. 7. In such examples, wireless network 110 (e.g., base station 111) requires its own SAR reduction logic 600 to interpret the flag or message.

FIG. 6 illustrates further detail for base station 111, showing SAR reduction logic 600. As noted above, in some examples, SAR reduction logic 600 interprets a flag or message from UE 102 indicating that UE 102 needs to suspend transmission, and reacts accordingly. In some examples, however, UE 102 operates using only legacy logic, and SAR reduction logic 600 implements the dynamic scheduling request framework alone.

SAR reduction logic 600 knows SAR limit 410 and average transmitted power threshold 412 (if different than SAR limit 410). SAR reduction logic 600 tracks historical average transmitted power 420 for UE 102 using a power headroom report 712 that is transmitted by UE 102 on a defined basis. SAR reduction logic 600 is thus also able to determine current peak transmit power 452 for UE 102. SAR reduction logic 600 calculates expected transmission power 424 using BSR value 510 received from UE 102. Combining expected transmission power 424 with historical average transmitted power 420, and accounting for the forward time progression of time period 430, gives future average transmitted power 422a.

If future average transmitted power 422a exceeds average transmitted power threshold 412, base station 111 determines that UE 102 needs to suspend or otherwise reduce transmitting. One option is for SAR reduction logic 600 to change whatever RB allocation it would otherwise provide to UE 102 if there was no risk of UE 102 violating SAR limit 410.

Base station 111 also has RB allocation logic 610 that allocates RBs to UEs when UEs have data to transmit. That is, RB allocation logic 610 schedules transmission events for the UEs it is serving, based on the amount and quality of service (QOS) of data that each UE has awaiting transmit. However, in some examples, SAR reduction logic 600 over-rides RB allocation logic 610 or instructs RB allocation logic 610 to allocate fewer (or no) RBs to UE 102 for the upcoming radio frame(s).

In normal operation, RB allocation logic 610 begins allocating RBs to a UE when a scheduling request (SR) 714 is received from the UE. BSR value 510a, BSR value 510b, and BSR value 510c, represent various values that may be taken on by BSR value 510 at different times. For example, BSR value 510a may represent the true BSR value, determined according to legacy rules, whereas BSR value 510b represents a zero value (or flag, or lower value) used by SAR reduction logic 500 in UE 102 to induce base station 111 to avoid allocating RBs to UE 102 (thereby resulting in UE 102 suspending transmissions). BSR value 510c may represent the true BSR value, determined according to legacy rules, when UE 102 is ready to resume transmission of data. In some examples, an indication 702 that UE 102 is suspending transmission may be used in lieu of setting BSR value 510b to zero or a flag, and an indication 704 that UE 102 is ready to resume transmission may be used in lieu of SR 714. Various RB allocations, such as an RB allocation 610a, an RB allocation 610b, and an RB allocation 610c are assigned to UE 102 at various times, in response to various ones of BSR values 510a-510c, as described below in relation to FIGS. 8-10.

FIG. 7 illustrates various exemplary messages that may be used in architecture 100. UL messages 710 include messages sent by UE 102 to base station, such as power headroom report 712 (there may be several), SR 714, a BSR message 716, other messages 718, and data awaiting transmit 504. BSR message 716 may carry any of BSR values 510a-510c, and other messages 718 may be indication 702 that UE 102 is suspending transmission, and indication 704 that UE 102 is ready to resume transmission. DL messages 720 include a power control message 722 that instructs UE 102 to increase or decrease its transmit power, and an RB allocation message 724 that carries any of RB allocations 610a-610b.

Figure 8:
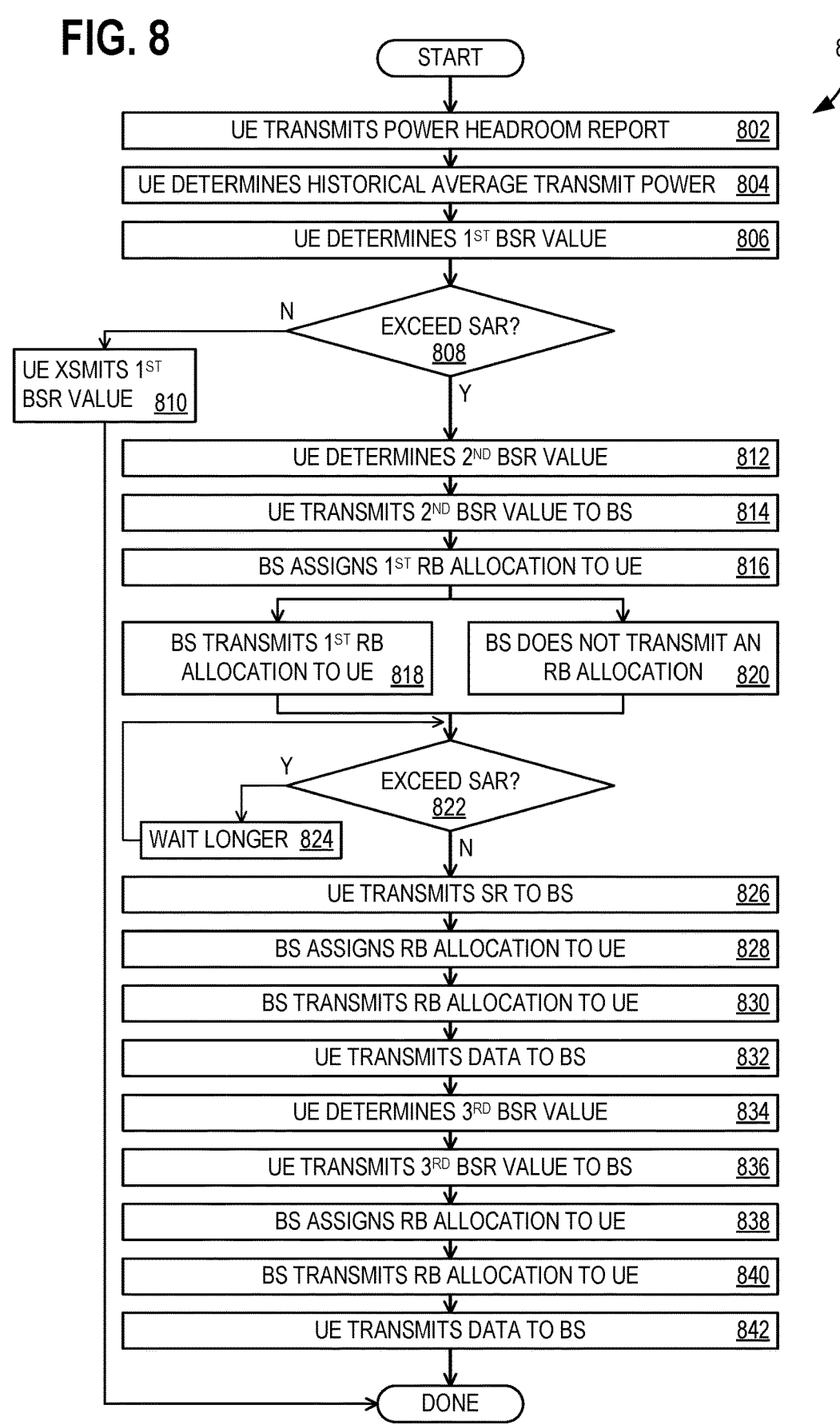
FIG. 8 illustrates a flowchart of exemplary operations associated with a first mode of operation of the architecture of FIG. 1.

FIG. 8 illustrates a flowchart 800 of exemplary operations associated with architecture 100. In some examples, at least a portion of flowchart 800 may be performed using one or more computing devices 1200 of FIG. 12. Operations 812-824 are for examples of architecture 100 in which UE 102 has the new functionality for SAR reduction, and base station 111 uses legacy operations for responding to BSR values. Flowchart 800 commences with UE 102 transmitting power headroom report 712 to base station 111, and base station 111 receiving power headroom report 712 from UE 102, in operation 802.

UE 102 determines historical average transmitted power 420 of UE 102 in operation 804, and UE 102 determines BSR value 510a indicating amount 524 of data awaiting transmit 504 operation 806. In decision operation 808, UE 102 determines whether transmitting data awaiting transmit 504 will result in future average transmitted power 422a of UE 102 exceeding average transmitted power threshold 412. In some examples, determining future average transmitted power 422*a* of UE 102 comprises combining expected transmission power 424 needed for transmitting data awaiting transmit 504 with at least a portion of historical average transmitted power 420 of UE 102. In some examples, historical average transmitted power 420 and future average transmitted power 422*a* for a defined length time period. In some examples, the defined length time period is six (6) minutes.

If average transmitted power threshold 412 will not be exceeded, UE 102 transmits BSR value 510*a* in operation 810, and flowchart 800 terminates to legacy operations until the next time UE 102 needs to schedule data transmission. At that point, flowchart 800 restarts.

If, however, UE 102 determines that average transmitted power threshold 412 will be exceeded, UE 102 determines BSR value 510*b* in operation 812. BSR value 510*b* may be zero, indicating that UE 102 does not have data awaiting transmit, or comprise a flag indicating that UE 102 is suspending transmission of data awaiting transmit 504. UE 102 transmits BSR value 510*b* to base station 111 in place of BSR value 510*a*, and base station 111 receives BSR value 510*b*, in operation 814. Transmitting BSR value 510*b* in place of BSR value 510*a* means that BSR value 510*b* is in the bitfield that would have been occupied by BSR value 510*a* in BSR message 716.

In operation 816, base station 111 assigns RB allocation 610*a* to UE 102, based on at least receiving BSR value 510*b*. In some examples, this is performed without reducing peak transmit power 452. Then, either base station 111 transmits RB allocation 610*a* to UE 102 (even if RB allocation 610*a* is zero) and UE 102 receives RB allocation 610*a* in operation 818, or base station 111 does not transmit an RB allocation for an upcoming radio frame and so UE does not receive an RB allocation in operation 820.

In decision operation 822, UE 102 determines whether transmitting data awaiting transmit 504 will result in future average transmitted power 422*b* exceeding average transmitted power threshold 412. If so, UE 102 waits longer in operation 824. When UE 102 determines that transmitting data awaiting transmit 504 will not result in future average transmitted power 422*b* exceeding average transmitted power threshold 412, UE 102 transmits SR 714 to base station 111 and base station 111 receives SR 714 in operation 826.

Base station 111 assigns RB allocation 610*b* to UE 102, based on at least receiving SR 714, in operation 828. Base station 111 transmits RB allocation 610*b* to UE 102 and UE 102 receives RB allocation 610*b* in operation 830. UE 102 transmits at least a portion of data awaiting transmit 504 to base station 111, according to RB allocation 610*b* in operation 832.

In operation 834, UE 102 determines BSR value 510*c* indicating the remaining amount 524 of data awaiting transmit 504. Due to the nature of BSR value 510*b* being used to suspend transmissions, BSR value 510*c* is a higher value than BSR value 510*b*. UE 102 continues to monitor whether future average transmitted power 422*b* will exceed average transmitted power threshold 412, as described above for decision operation 808. If at this point, UE determines that future average transmitted power 422*b* will not exceed average transmitted power threshold 412, UE 102 transmits BSR value 510*c* to serving base station 111 and base station 111 receives BSR value 510*c* in operation 836. This is the equivalent of operation 810 described above. Otherwise, UE 102 would repeat operations 812 and 814.

Base station 111 assigns RB allocation 610*c* to UE 102, based on at least receiving BSR value 510*c* in operation 838. Base station 111 transmits RB allocation 610*c* to UE 102 and UE 102 receives RB allocation 610*c* in operation 840. UE 102 transmits at least a portion of data awaiting transmit 504 to base station 111, according to RB allocation 610*c* in operation 842.

Figure 9:
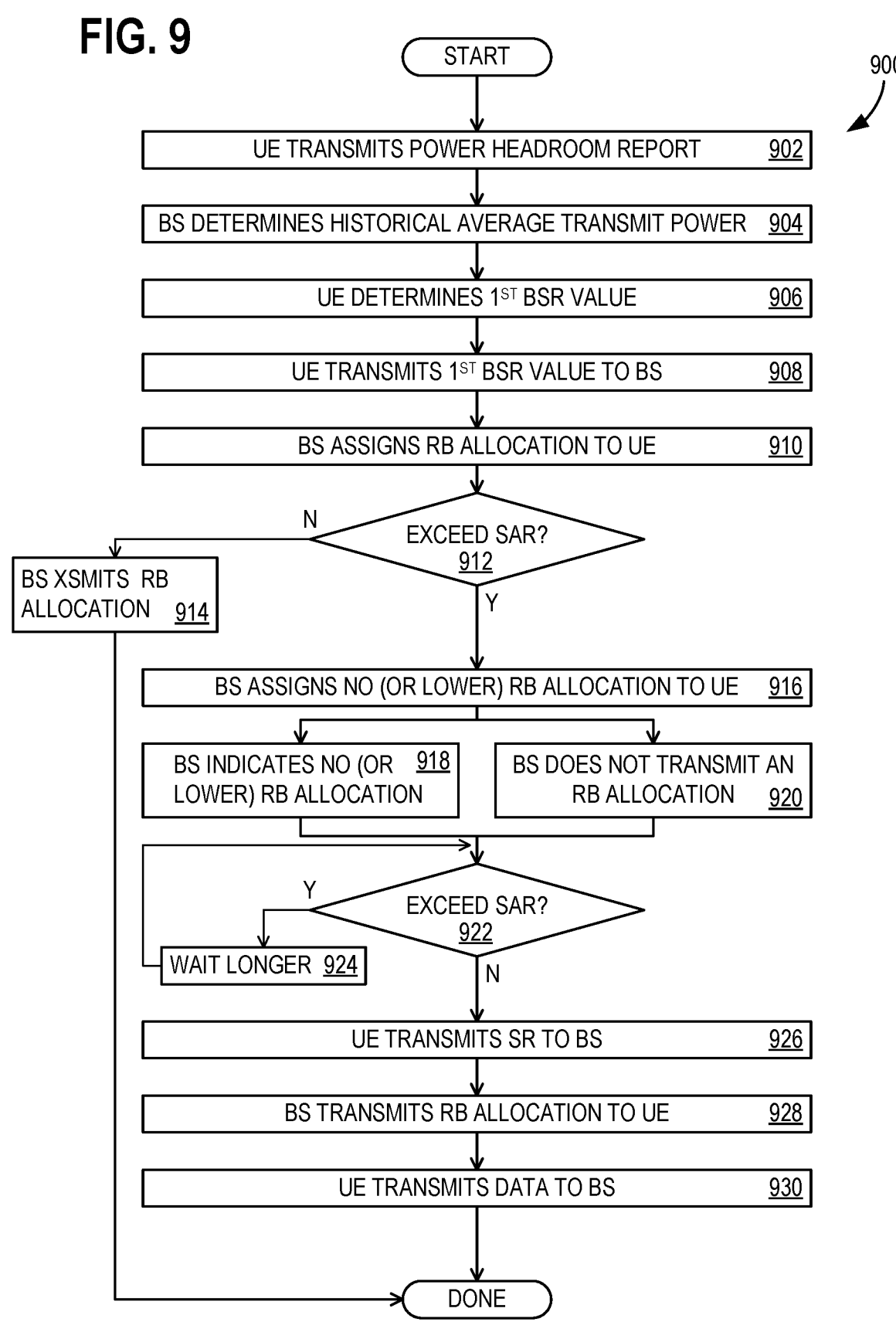
FIG. 9 illustrates a flowchart of exemplary operations associated with a second mode of operation of the architecture of FIG. 1.

FIG. 9 illustrates a flowchart 900 of exemplary operations associated with architecture 100. In some examples, at least a portion of flowchart 900 may be performed using one or more computing devices 1200 of FIG. 12. Operations 904-926 are for examples of architecture 100 in which base station 111 has the new functionality for SAR reduction, and UE 102 uses legacy operations of merely responding to RB allocations. Flowchart 900 commences with UE 102 transmitting power headroom report 712 to base station 111 and base station 111 receiving power headroom report 712 from UE 102 in operation 902.

In operation 904, base station 111 or another node of wireless network 110 determines historical average transmitted power 420 and current peak transmit power 452 of UE 102, using power headroom report 712 received from UE 102. Other computational actions attributed to base station 111 in flowchart 900 may be performed by another node of wireless network 110, in some examples.

UE 102 determines BSR value 510*a* indicating amount 524 of data awaiting transmit 504 in operation 906. UE 102 transmits BSR value 510*a* to base station 111 and base station 111 receives BSR value 510*a* from UE 102 in operation 908. In operation 910, base station 111 determines RB allocation 610*a* based on at least BSR value 510*a*, and in decision operation 912, base station 111 determines whether UE 102 transmitting data according to RB allocation 610*a* will result in future average transmitted power 422*a* of UE 102 exceeding average transmitted power threshold 412. In some examples, base station 111 uses at least historical average transmitted power 420 and current peak transmit power 452 of UE 102 to determine future average transmitted power 422*a*.

If future average transmitted power 422*a* will not exceed average transmitted power threshold 412, base station 111 transmits RB allocation 610*a* to UE 102 in operation 914 and flowchart 900 terminates until base station needs to determine another RB allocation for UE 102. At that point, flowchart 900 restarts.

If, however, base station 111 determines that UE 102 transmitting data according to RB allocation 610*a* will result in future average transmitted power 422*a* of UE 102 exceeding average transmitted power threshold 412, base station 111 determines RB allocation 610*b*, which is lower than RB allocation 610*a* in operation 916. RB allocation 610*b* is zero or is low enough that when UE 102 transmits data according to RB allocation 610*b*, future average transmitted power 422*a* of UE 102 will not exceed average transmitted power threshold 412. Then, base station 111 indicates RB allocation 610*b* to UE 102 using either operation 918, in which base station 111 transmits RB allocation 610*b* to UE 102 (even if it is a zero value) and UE 102 receives RB allocation 610*b*, or operation 920 in which base station 111 does not transmit any RB allocation to UE 102 for an upcoming radio frame. Either of these may be accomplished without instructing UE 102 to reduce peak transmit power 452.

In decision operation 922, base station 111 determines whether UE 102 transmitting data awaiting transmit 504 will result in future average transmitted power 422*b* exceeding average transmitted power threshold 412. If so, base station 111 waits longer in operation 924. When base station 111 determines that UE 102 transmitting data awaiting transmit 504 will not result in future average transmitted power 422b exceeding average transmitted power threshold 412 base station 111 determines RB allocation 610c for UE 102 in operation 926. Due to the nature of RB allocation 610b being used to suspend transmissions, RB allocation 610c is a higher value than RB allocation 610b.

Base station 111 transmits RB allocation 610c to UE 102 and UE 102 receives RB allocation 610c in operation 928. UE 102 transmits at least a portion of data awaiting transmit 504 to base station 111, according to RB allocation 610c in operation 930. At this point, flowchart 900 repeats.

Figure 10:
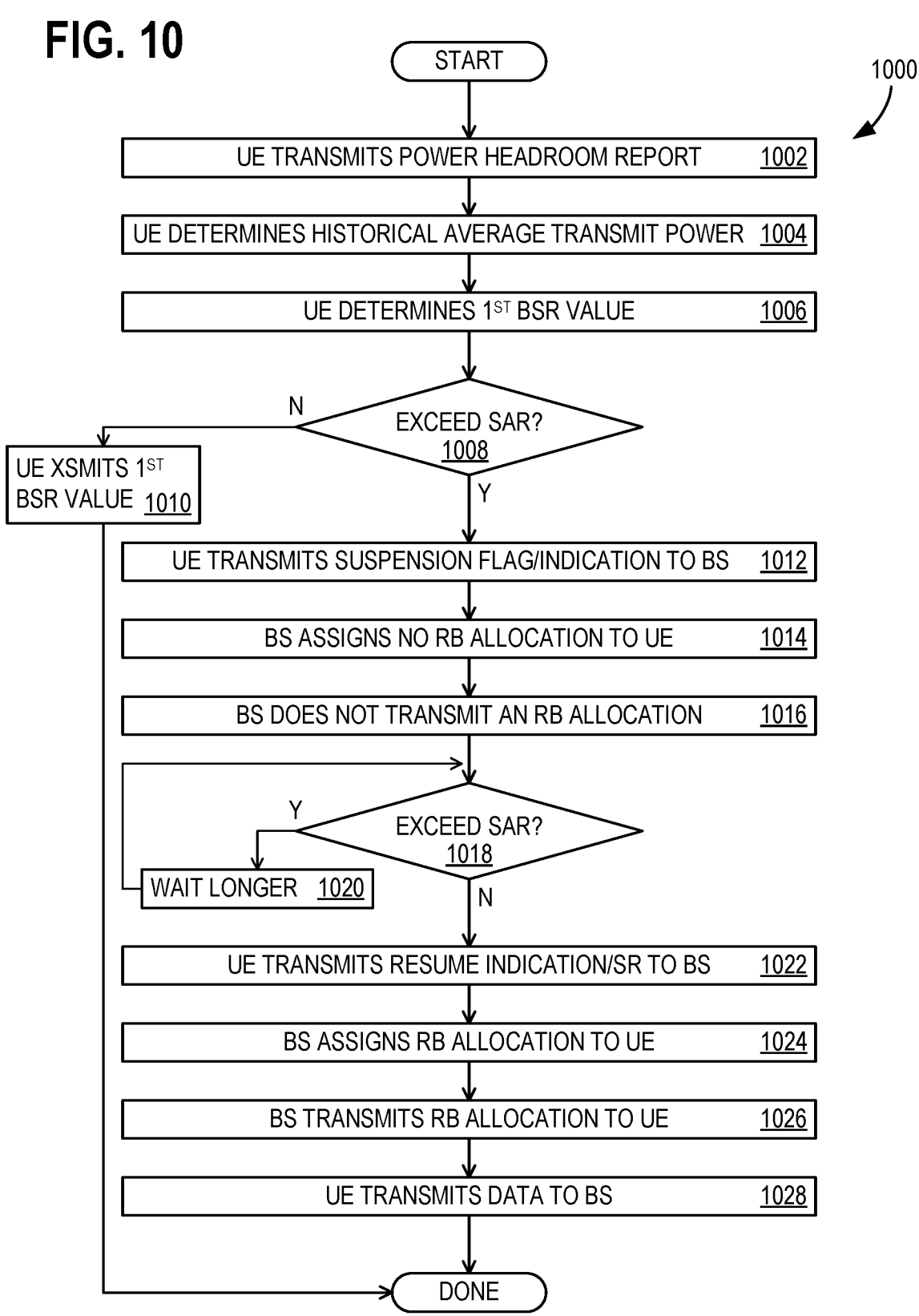
FIG. 10 illustrates a flowchart of exemplary operations associated with a third mode of operation of the architecture of FIG. 1.

FIG. 10 illustrates a flowchart 1000 of exemplary operations associated with architecture 100. In some examples, at least a portion of flowchart 1000 may be performed using one or more computing devices 1200 of FIG. 12. Flowchart 1000 is for examples of architecture 100 in which both UE 102 and base station 111 have new functionality for SAR reduction, and commences with UE 102 transmitting power headroom report 712 to base station 111 and base station 111 receiving power headroom report 712 from UE 102 in operation 1002.

UE 102 determines historical average transmitted power 420 of UE 102 in operation 1004, and determines BSR value 510a indicating amount 524 of data awaiting transmit 504 in operation 1006. In decision operation 1008, UE 102 determines whether transmitting data awaiting transmit 504 will result in future average transmitted power 422a of UE 102 exceeding average transmitted power threshold 412, as described above for decision operation 808 of flowchart 800.

If average transmitted power threshold 412 will not be exceeded, UE 102 transmits BSR value 510a in operation 1010, and flowchart 1000 terminates to legacy operations until the next time UE 102 needs to schedule data transmission. At that point, flowchart 1000 restarts.

If, however, UE 102 determines that average transmitted power threshold 412 will be exceeded, UE 102 transmits indication 702 that UE 102 is suspending transmission of data awaiting transmit 504, and base station 111 receives indication 702, in operation 1012. In some examples, indication 702 comprises a flag in place of BSR value 510a. In some examples, indication 702 comprises a message separate from BSR message 716.

In operation 1014, base station 111 does not assign an RB allocation to UE 102, based on at least receiving indication 702, but in some examples, does not reduce peak transmit power 452 for UE 102 (i.e., does not send power control message 722 instructing UE 102 to lower its transmit power). In operation 1016, base station 111 does not transmit an RB allocation to UE 102 for an upcoming radio frame, and so UE 102 does not receive an RB allocation.

In decision operation 1018, UE 102 determines whether transmitting data awaiting transmit 504 will result in future average transmitted power 422b exceeding average transmitted power threshold 412. If so, UE 102 waits longer in operation 1020. When UE 102 determines that transmitting data awaiting transmit 504 will not result in future average transmitted power 422b exceeding average transmitted power threshold 412, UE 102 transmits indication 702 that UE 102 is ready to resume transmission of data awaiting transmit 504 in operation 1022. Base station 111 receives indication 702. In some examples, indication 704 comprises SR 714.

Base station 111 assigns RB allocation 610a to UE 102, based on at least receiving indication 704, in operation 1024. Base station 111 transmits RB allocation 610a to UE 102 and UE 102 receives RB allocation 610a in operation 1026. UE

102 transmits at least a portion of data awaiting transmit 504 to base station 111, according to RB allocation 610b in operation 1028. Flowchart 1000 then restarts.

FIG. 11A illustrates a flowchart 1100 of exemplary operations associated with examples of architecture 100. In some examples, at least a portion of flowchart 1100 may be performed using one or more computing devices 1200 of FIG. 12. Flowchart 1100 commences with operation 1102, which includes determining, by a UE, a first BSR value indicating an amount of data awaiting transmit.

Operation 1104 includes determining, by the UE, that transmitting the data awaiting transmit will result in a future average transmitted power of the UE exceeding an average transmitted power threshold, wherein the average transmitted power threshold is based on at least a SAR limit. Operation 1106 includes, based on at least determining that transmitting the data awaiting transmit will result in the future average transmitted power of the UE exceeding the average transmitted power threshold, transmitting, by the UE, to a serving base station, a second BSR value lower than the first BSR value, in place of the first BSR value.

FIG. 11B illustrates a flowchart 1110 of exemplary operations associated with examples of architecture 100. In some examples, at least a portion of flowchart 1110 may be performed using one or more computing devices 1200 of FIG. 12. Flowchart 1110 commences with operation 1112, which includes determining, by a wireless network, based on at least a first BSR value for a UE, a first RB allocation for the UE.

Operation 1114 includes determining, by the wireless network, based on at least the first RB allocation for the UE, the historical average transmitted power of the UE, and a current peak transmit power of the UE, that transmitting data, by the UE, according to the first RB allocation will result in the UE exceeding an average transmitted power threshold, wherein the average transmitted power threshold is based on at least a SAR limit. Operation 1116 includes determining a second RB allocation for the UE lower than the first RB allocation. Operation 1118 includes, without instructing the UE to reduce peak transmit power, indicating, by a serving base station of the wireless network, to the UE, the second RB allocation lower than the first RB allocation.

FIG. 11C illustrates a flowchart 1120 of exemplary operations associated with examples of architecture 100. In some examples, at least a portion of flowchart 1120 may be performed using one or more computing devices 1200 of FIG. 12. Flowchart 1120 commences with operation 1122, which includes determining, by a UE, a first BSR value indicating an amount of data awaiting transmit.

Operation 1124 includes determining, by the UE, that transmitting the data awaiting transmit will result in a future average transmitted power of the UE exceeding an average transmitted power threshold, wherein the average transmitted power threshold is based on at least a SAR limit. Operation 1126 includes, based on at least determining that transmitting the data awaiting transmit will result in the future average transmitted power of the UE exceeding the average transmitted power threshold, transmitting, by the UE, to a serving base station, an indication that the UE is suspending transmission of the data awaiting transmit.

Figure 12:
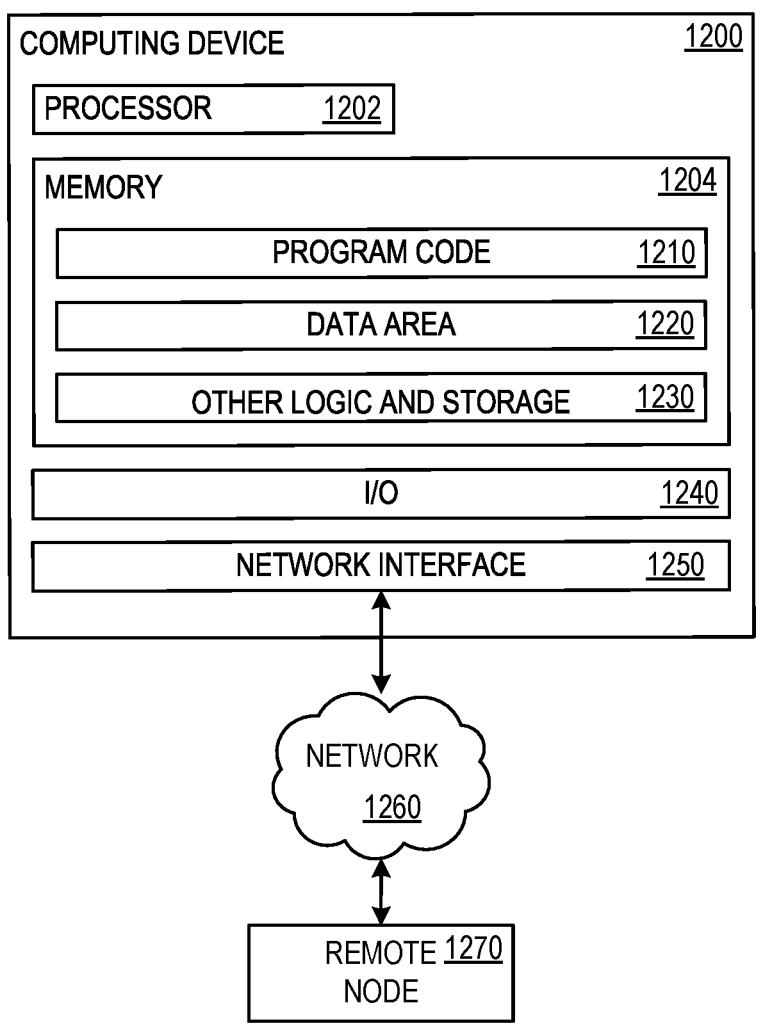
FIG. 12 illustrates a block diagram of a computing device suitable for implementing various aspects of the disclosure.

FIG. 12 illustrates a block diagram of computing device 1200 that may be used as any component described herein that may require computational or storage capacity. Computing device 1200 has at least a processor 1202 and a memory 1204 that holds program code 1210, data area 1220, and other logic and storage 1230. Memory 1204 is any device allowing information, such as computer executable instructions and/or other data, to be stored and retrieved. For example, memory 1204 may include one or more random access memory (RAM) modules, flash memory modules, hard disks, solid-state disks, persistent memory devices, and/or optical disks. Program code 1210 comprises computer executable instructions and computer executable components including instructions used to perform operations described herein. Data area 1220 holds data used to perform operations described herein. Memory 1204 also includes other logic and storage 1230 that performs or facilitates other functions disclosed herein or otherwise required of computing device 1200. An input/output (I/O) component 1240 facilitates receiving input from users and other devices and generating displays for users and outputs for other devices. A network interface 1250 permits communication over external network 1260 with a remote node 1270, which may represent another implementation of computing device 1200. For example, a remote node 1270 may represent another of the above-noted nodes within architecture 100.

Additional Examples

An example system comprises: a processor; and a computer-readable medium storing instructions that are operative upon execution by the processor to: determine, by a UE, a first BSR value indicating an amount of data awaiting transmit; determine, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmit, by the UE, to a serving base station, a second BSR value lower than the first BSR value, in place of the first BSR value.

An example method of wireless communication comprises: determining, by a UE, a first BSR value indicating an amount of data awaiting transmit; determining, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmitting, by the UE, to a serving base station, a second BSR value lower than the first BSR value, in place of the first BSR value.

One or more example computer storage devices has computer-executable instructions stored thereon, which, upon execution by a computer, cause the computer to perform operations comprising: determining, by a UE, a first BSR value indicating an amount of data awaiting transmit; determining, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmitting, by the UE, to a serving base station, a second BSR value lower than the first BSR value, in place of the first BSR value.

Another example system comprises: a processor; and a computer-readable medium storing instructions that are operative upon execution by the processor to: determine, by a wireless network, based on at least a first BSR value for a UE, a first RB allocation for the UE; determine, by the wireless network, based on at least the first RB allocation for the UE, the historical average transmitted power of the UE, and a current peak transmit power of the UE, that transmitting data, by the UE, according to the first RB allocation will result in the UE exceeding an average transmitted power threshold, wherein the average transmitted power threshold is based on at least a SAR limit; determine a second RB allocation for the UE lower than the first RB allocation; and without instructing the UE to reduce peak transmit power, indicate, by a serving base station of the wireless network, to the UE, the second RB allocation lower than the first RB allocation.

Another example method of wireless communication comprises: determining, by a wireless network, based on at least a first BSR value for a UE, a first RB allocation for the UE; determining, by the wireless network, based on at least the first RB allocation for the UE, the historical average transmitted power of the UE, and a current peak transmit power of the UE, that transmitting data, by the UE, according to the first RB allocation will result in the UE exceeding an average transmitted power threshold, wherein the average transmitted power threshold is based on at least a SAR limit; determining a second RB allocation for the UE lower than the first RB allocation; and without instructing the UE to reduce peak transmit power, indicating, by a serving base station of the wireless network, to the UE, the second RB allocation lower than the first RB allocation.

One or more additional example computer storage devices has computer-executable instructions stored thereon, which, upon execution by a computer, cause the computer to perform operations comprising: determining, by a wireless network, based on at least a first BSR value for a UE, a first RB allocation for the UE; determining, by the wireless network, based on at least the first RB allocation for the UE, the historical average transmitted power of the UE, and a current peak transmit power of the UE, that transmitting data, by the UE, according to the first RB allocation will result in the UE exceeding an average transmitted power threshold, wherein the average transmitted power threshold is based on at least a SAR limit; determining a second RB allocation for the UE lower than the first RB allocation; and without instructing the UE to reduce peak transmit power, indicating, by a serving base station of the wireless network, to the UE, the second RB allocation lower than the first RB allocation.

Another example system comprises: a processor; and a computer-readable medium storing instructions that are operative upon execution by the processor to: determine, by a UE, a first BSR value indicating an amount of data awaiting transmit; determine, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmit, by the UE, to a serving base station, an indication that the UE is suspending transmission of the data awaiting transmit.

Another example method of wireless communication comprises: determining, by a UE, a first BSR value indicating an amount of data awaiting transmit; determining, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmitting, by the UE, to a serving base station, an indication that the UE is suspending transmission of the data awaiting transmit.

One or more additional example computer storage devices has computer-executable instructions stored thereon, which, upon execution by a computer, cause the computer to perform operations comprising: determining, by a UE, a first BSR value indicating an amount of data awaiting transmit; determining, by the UE, that transmitting the data awaiting transmit will result in a future average transmitted power of the UE exceeding an average transmitted power threshold, wherein the average transmitted power threshold is based on at least a SAR limit; and based on at least determining that transmitting the data awaiting transmit will result in the future average transmitted power of the UE exceeding the average transmitted power threshold, transmitting, by the UE, to a serving base station, an indication that the UE is suspending transmission of the data awaiting transmit.

Alternatively, or in addition to the other examples described herein, examples include any combination of the following:

receiving, by the UE, the first RB allocation from the serving base station, the first RB allocation being based on at least the second BSR value;

based on at least the second BSR value, receiving, by the UE, no RB allocation from the serving base station for an upcoming radio frame;

determining, by the UE, that transmitting the data awaiting transmit will not result in the future average transmitted power of the UE exceeding the average transmitted power threshold;

based on at least determining that transmitting the data awaiting transmit will not result in the future average transmitted power of the UE exceeding the average transmitted power threshold, transmitting, by the UE, to the serving base station, a SR;

based on at least receiving a second RB allocation from the serving base station, transmitting, by the UE, to the serving base station, at least a portion of the data awaiting transmit according to the second RB allocation, the second RB allocation being based on at least the SR;

the first RB allocation is zero;

determining, by the UE, a third BSR value indicating the amount of data awaiting transmit;

transmitting, by the UE, to the serving base station, the third BSR value;

based on at least receiving a third RB allocation from the serving base station, transmitting, by the UE, to the serving base station, at least a portion of the data awaiting transmit according to the third RB allocation, the third RB allocation being based on at least the third BSR value;

based on at least receiving the second BSR value, assigning the first RB allocation to the UE;

based on at least receiving the SR, assigning the second RB allocation to the UE;

transmitting, by the serving base station, to the UE, the first RB allocation;

based on at least receiving the third BSR value, assigning a third RB allocation to the UE;

transmitting, by the serving base station, to the UE, the third RB allocation;

the second BSR value indicates that the UE does not have data awaiting transmit;

the second BSR value comprises a flag indicating that the UE is suspending transmission of the data awaiting transmit;

not reducing peak transmit power based on determining that transmitting the data awaiting transmit will result in the future average transmitted power of the UE exceeding the average transmitted power threshold;

the first BSR value is an index value indicating a range of data awaiting transmit;

the first BSR value uses six bits;

the second BSR value is zero;

the second BSR value is a negative value;

determining, by the UE, a historical average transmitted power of the UE;

determining the future average transmitted power of the UE comprises combining an expected transmission power needed for transmitting the data awaiting transmit with at least a portion of the historical average transmitted power of the UE;

the historical average transmitted power of the UE and the future average transmitted power of the UE are for a defined length time period;

the defined length time period is six minutes;

the third BSR value is higher than the second BSR value;

receiving, by the serving base station, the second BSR value;

receiving, by the serving base station, the SR;

receiving, by the serving base station, the third BSR value;

the UE comprises a PC2 UE or a higher power UE;

the second RB allocation is not zero;

determining, by the wireless network, the second RB allocation such that transmitting data, by the UE, according to the second RB allocation will not result in the UE exceeding an average transmitted power threshold, and wherein indicating the second RB allocation to the UE comprises transmitting the second RB allocation to the UE;

determining, by the wireless network, that transmitting the data awaiting transmit, by the UE, will not result in a future average transmitted power of the UE exceeding the average transmitted power threshold;

based on at least determining that transmitting the data awaiting transmit will not result in the future average transmitted power of the UE exceeding the average transmitted power threshold, determining a third RB allocation for the UE higher than the second RB allocation;

transmitting, by the serving base station, to the UE, the third RB allocation;

receiving, from the UE, a second BSR value;

the third RB allocation is based on at least the second BSR value;

determining, by the wireless network, the historical average transmitted power of the UE based on at least a power headroom report received from the UE;

the UE comprises a PC2 UE or a higher power UE;

the UE uses TDD;

receiving, from the UE, the power headroom report;

receiving, from the UE, the first BSR value;

the indication that the UE is suspending transmission of the data awaiting transmit comprises a flag in place of the first BSR value;

the indication that the UE is suspending transmission of the data awaiting transmit comprises a message separate from a BSR value;

based on at least determining that transmitting the data awaiting transmit will not result in the future average transmitted power of the UE exceeding the average transmitted power threshold, transmitting, by the UE, to the serving base station, an indication that the UE is ready to resume transmission of the data awaiting transmit;

the indication that the UE is ready to resume transmission of the data awaiting transmit comprises an SR;

based on at least receiving the indication that the UE is suspending transmission of the data awaiting transmit, not assigning an RB allocation to the UE;

based on at least receiving the indication that the UE is ready to resume transmission of the data awaiting transmit, assigning an RB allocation to the UE;

transmitting, by the serving base station, to the UE, the RB allocation;

after receiving the RB allocation, determining, by the UE, a second BSR value indicating the amount of data awaiting transmit;

transmitting, by the UE, to the serving base station, the second BSR value;

receiving, by the serving base station, the indication that the UE is suspending transmission of the data awaiting transmit; and receiving, by the serving base station, the indication that the UE is ready to resume transmission of the data awaiting transmit.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

determining, by a wireless network, based on at least a first buffer status report (BSR) value for a user equipment (UE), a first resource block (RB) allocation for the UE;

determining, by the wireless network, based on at least the first RB allocation for the UE, a historical average transmitted power of the UE, and a current peak transmit power of the UE, that transmitting data, by the UE, according to the first RB allocation will result in the UE exceeding an average transmitted power threshold, wherein the average transmitted power threshold is based on at least a specific absorption rate (SAR) limit;

determining a second RB allocation for the UE lower than the first RB allocation; and without instructing the UE to reduce peak transmit power, indicating, by a serving base station of the wireless network, to the UE, the second RB allocation lower than the first RB allocation.

2. The method of claim 1, wherein the second RB allocation is zero.

3. The method of claim 1, wherein the second RB allocation is not zero, and wherein the method further comprises:

determining, by the wireless network, the second RB allocation such that transmitting data, by the UE, according to the second RB allocation will not result in the UE exceeding an average transmitted power threshold, and wherein indicating the second RB allocation to the UE comprises transmitting the second RB allocation to the UE.

4. The method of claim 1, further comprising:

determining, by the wireless network, that transmitting the data awaiting transmit, by the UE, will not result in a future average transmitted power of the UE exceeding the average transmitted power threshold;

based on at least determining that transmitting the data awaiting transmit will not result in the future average transmitted power of the UE exceeding the average transmitted power threshold, determining a third RB allocation for the UE higher than the second RB allocation; and transmitting, by the serving base station, to the UE, the third RB allocation.

5. The method of claim 4, further comprising:

receiving, from the UE, a second BSR value, wherein the third RB allocation is based on at least the second BSR value.

6. The method of claim 1, further comprising:

determining, by the wireless network, the historical average transmitted power of the UE based on at least a power headroom report received from the UE.

7. The method of claim 1, wherein the UE comprises a power class 2 (PC2) UE or a higher power UE, and wherein the UE uses time division duplexing (TDD).

8. A system comprising:

a processor; and a computer-readable medium storing instructions that are operative upon execution by the processor to:

determine, by a wireless network, based on at least a first buffer status report (BSR) value for a user equipment (UE), a first resource block (RB) allocation for the UE;

determine, by the wireless network, based on at least the first RB allocation for the UE, a historical average transmitted power of the UE, and a current peak transmit power of the UE, that transmitting data, by the UE, according to the first RB allocation will result in the UE exceeding an average transmitted power threshold, wherein the average transmitted power threshold is based on at least a specific absorption rate (SAR) limit;

determine a second RB allocation for the UE lower than the first RB allocation; and without instructing the UE to reduce peak transmit power, indicate, by a serving base station of the wireless network, to the UE, the second RB allocation lower than the first RB allocation.

9. The system of claim 8, wherein the second RB allocation is zero.

10. The system of claim 8, wherein the second RB allocation is not zero, and wherein the operations are further operative to:

determine, by the wireless network, the second RB allocation such that transmitting data, by the UE, according to the second RB allocation will not result in the UE exceeding an average transmitted power threshold, and wherein indicating the second RB allocation to the UE comprises transmitting the second RB allocation to the UE.

11. The system of claim 8, wherein the operations are further operative to:

determine, by the wireless network, that transmitting the data awaiting transmit, by the UE, will not result in a future average transmitted power of the UE exceeding the average transmitted power threshold;

based on at least determining that transmitting the data awaiting transmit will not result in the future average transmitted power of the UE exceeding the average transmitted power threshold, determine a third RB allocation for the UE higher than the second RB allocation; and transmit, by the serving base station, to the UE, the third RB allocation.

12. The system of claim 11, wherein the operations are further operative to:

receive, from the UE, a second BSR value, wherein the third RB allocation is based on at least the second BSR value.

13. The system of claim 8, wherein the operations are further operative to:

determine, by the wireless network, the historical average transmitted power of the UE based on at least a power headroom report received from the UE.

14. The system of claim 8, wherein the UE comprises a power class 2 (PC2) UE or a higher power UE, and wherein the UE uses time division duplexing (TDD).

15. One or more computer storage devices having computer-executable instructions stored thereon, which, upon execution by a computer, cause the computer to perform operations comprising:

determining, by a wireless network, based on at least a first buffer status report (BSR) value for a user equipment (UE), a first resource block (RB) allocation for the UE;

determining, by the wireless network, based on at least the first RB allocation for the UE, a historical average transmitted power of the UE, and a current peak transmit power of the UE, that transmitting data, by the UE, according to the first RB allocation will result in the UE exceeding an average transmitted power threshold, wherein the average transmitted power threshold is based on at least a specific absorption rate (SAR) limit;

determining a second RB allocation for the UE lower than the first RB allocation; and without instructing the UE to reduce peak transmit power, indicating, by a serving base station of the wireless network, to the UE, the second RB allocation lower than the first RB allocation.

16. The one or more computer storage devices of claim 15, wherein the second RB allocation is zero.

17. The one or more computer storage devices of claim 15, wherein the second RB allocation is not zero, and wherein the operations further comprise:

determining, by the wireless network, the second RB allocation such that transmitting data, by the UE, according to the second RB allocation will not result in the UE exceeding an average transmitted power threshold, and wherein indicating the second RB allocation to the UE comprises transmitting the second RB allocation to the UE.

18. The one or more computer storage devices of claim 15, wherein the operations further comprise:

determining, by the wireless network, that transmitting the data awaiting transmit, by the UE, will not result in a future average transmitted power of the UE exceeding the average transmitted power threshold;

based on at least determining that transmitting the data awaiting transmit will not result in the future average transmitted power of the UE exceeding the average transmitted power threshold, determining a third RB allocation for the UE higher than the second RB allocation; and transmitting, by the serving base station, to the UE, the third RB allocation.

19. The one or more computer storage devices of claim 18, wherein the operations further comprise:

receiving, from the UE, a second BSR value, wherein the third RB allocation is based on at least the second BSR value.

20. The one or more computer storage devices of claim 15, wherein the operations further comprise:

determining, by the wireless network, the historical average transmitted power of the UE based on at least a power headroom report received from the UE.

* * * * *